(12) United States Patent
Balk

(10) Patent No.: US 9,090,025 B2
(45) Date of Patent: Jul. 28, 2015

(54) FITTING INCLUDING A COMPOSITE MATERIAL BRACKET AND A STIFFENER

(75) Inventor: Wouter Balk, Melun (FR)

(73) Assignee: SAFRAN, Paris (FR)

( * ) Notice: Subject to any disclaimer, the term of this patent is extended or adjusted under 35 U.S.C. 154(b) by 239 days.

(21) Appl. No.: 13/565,121

(22) Filed: Aug. 2, 2012

(65) Prior Publication Data

US 2013/0032681 A1 Feb. 7, 2013

(30) Foreign Application Priority Data

Aug. 5, 2011 (FR) ...................................... 11 57215

(51) Int. Cl.
| | | |
|---|---|---|
| E04B 2/30 | (2006.01) | |
| B29C 65/00 | (2006.01) | |
| B29C 70/46 | (2006.01) | |
| F16L 3/13 | (2006.01) | |
| B29C 53/04 | (2006.01) | |
| B29C 65/02 | (2006.01) | |

(Continued)

(52) U.S. Cl.
CPC ............... *B29C 66/742* (2013.01); *B29C 53/04* (2013.01); *B29C 65/02* (2013.01); *B29C 66/30325* (2013.01); *B29C 66/532* (2013.01); *B29C 66/721* (2013.01); *B29C 66/7392* (2013.01); *B29C 66/81417* (2013.01); *B29C 66/81422* (2013.01); *B29C 66/81423* (2013.01); *B29C 66/81427* (2013.01); *B29C 66/81431* (2013.01); *B29C 66/8322* (2013.01); *B29C 70/46* (2013.01); *F16L 3/13* (2013.01); *B29C 66/71* (2013.01); *B29C 66/7212* (2013.01); *B29C 66/72141* (2013.01); *B29C 66/7394* (2013.01); *B29C 66/7422* (2013.01); *B29C 66/919* (2013.01); *B29C 66/91411* (2013.01); *B29L 2031/3076* (2013.01); *B64C 1/406* (2013.01)

(58) Field of Classification Search
CPC .... F16L 3/13; B29C 66/30325; B29C 66/721
USPC ........ 248/235, 30, 200; 52/489.1, 573.1, 713, 52/712, 715; 403/403, 231, 292, 270, 295, 403/375, 382; 156/91, 475
See application file for complete search history.

(56) References Cited

U.S. PATENT DOCUMENTS

| | | | |
|---|---|---|---|
| 498,027 A | | 5/1893 | Recht |
| 3,493,202 A | * | 2/1970 | Jensen .......................... 248/538 |

(Continued)

FOREIGN PATENT DOCUMENTS

| | | |
|---|---|---|
| WO | WO 2007/078272 A2 | 7/2007 |
| WO | WO 2010/122122 A1 | 10/2010 |

OTHER PUBLICATIONS

French Preliminary Search Report issued Mar. 27, 2012 in corresponding French Application No. 11 57215 filed on Aug. 5, 2011 (with an English Translation of Categories).

*Primary Examiner* — Anita M King
(74) *Attorney, Agent, or Firm* — Oblon, McClelland, Maier & Neustadt, L.L.P.

(57) ABSTRACT

A fitting including at least one composite material bracket with two flat segments forming an angle less than 180° on an inside of the bracket and an angle greater than 180° on an outside of the bracket, together with a stiffener extending on the inside of the bracket between the two flat segments is disclosed. The bracket presents a slot crossing a straight line between the two flat segments, the slot extending into the two flat segments. The stiffener is folded in register with the slot and includes tabs fastened to each of the two flat segments.

11 Claims, 7 Drawing Sheets

(51) Int. Cl.
*B64C 1/40* (2006.01)
*B29L 31/30* (2006.01)

(56) References Cited

U.S. PATENT DOCUMENTS

| | | | |
|---|---|---|---|
| 3,828,514 A * | 8/1974 | Jureit | 403/230 |
| 5,846,018 A * | 12/1998 | Frobosilo et al. | 403/403 |
| 6,669,156 B2 * | 12/2003 | East et al. | 248/300 |
| 6,688,069 B2 * | 2/2004 | Zadeh | 52/715 |
| 7,281,696 B2 * | 10/2007 | Kida et al. | 248/300 |
| 7,478,508 B2 * | 1/2009 | Peterson | 52/573.1 |
| 7,658,356 B1 * | 2/2010 | Nehls | 248/300 |
| D644,503 S * | 9/2011 | Crane et al. | D8/382 |
| 8,197,160 B2 * | 6/2012 | Stankus et al. | 405/302.3 |
| 8,555,592 B2 * | 10/2013 | Daudet et al. | 52/489.1 |
| 2012/0037764 A1 | 2/2012 | Stephan et al. | |

* cited by examiner

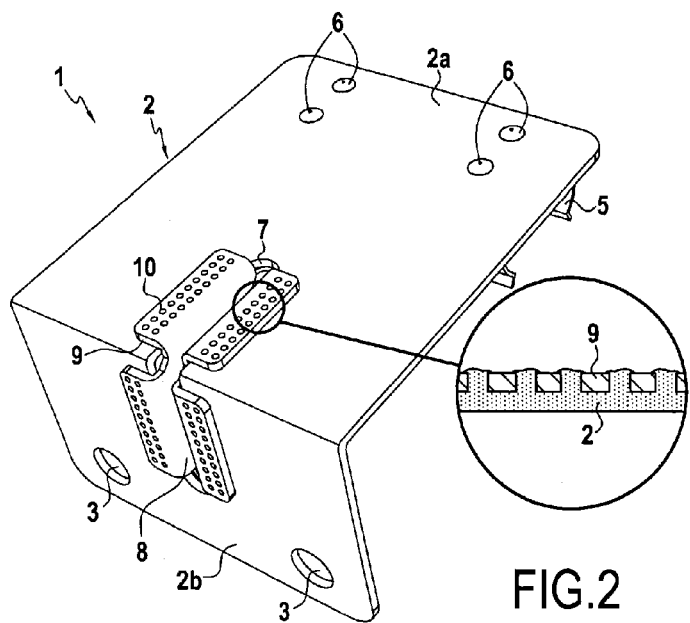
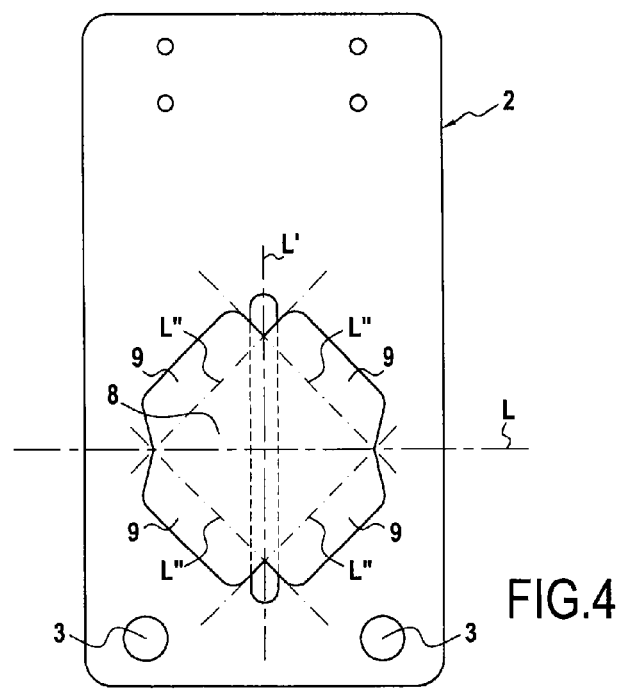

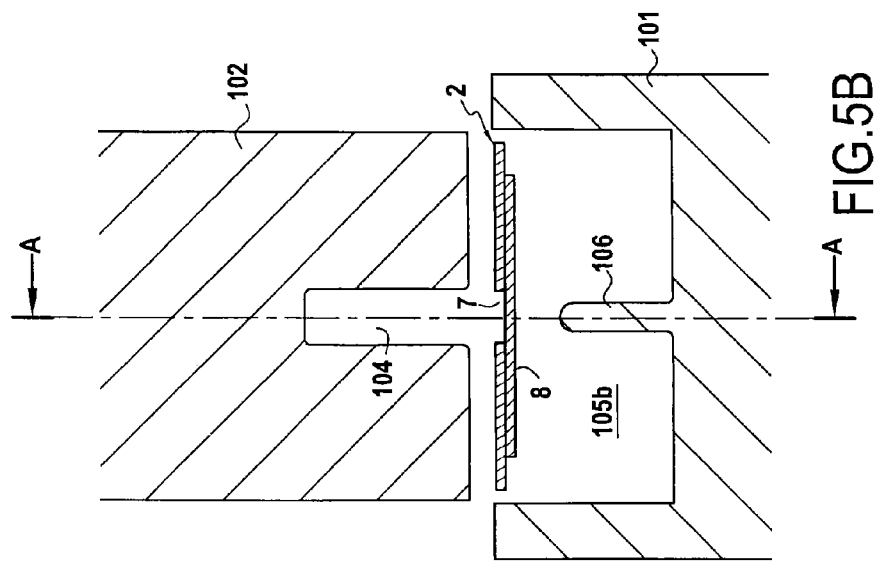
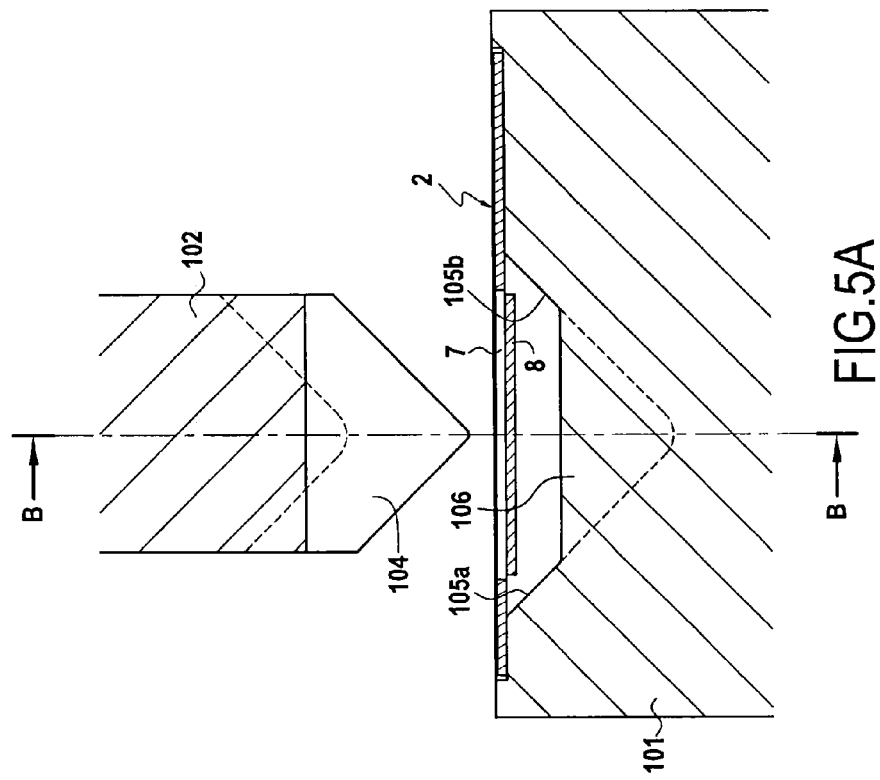

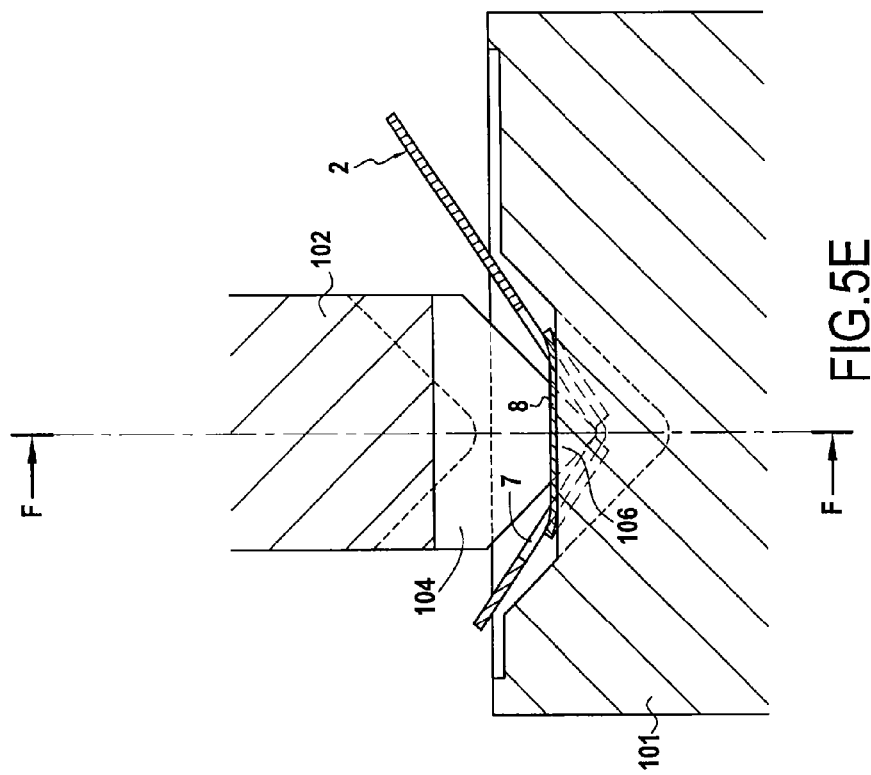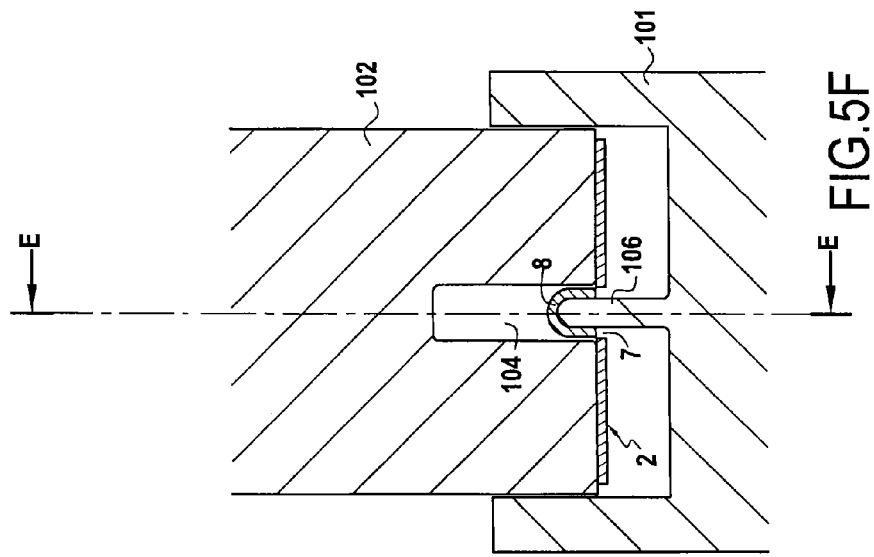

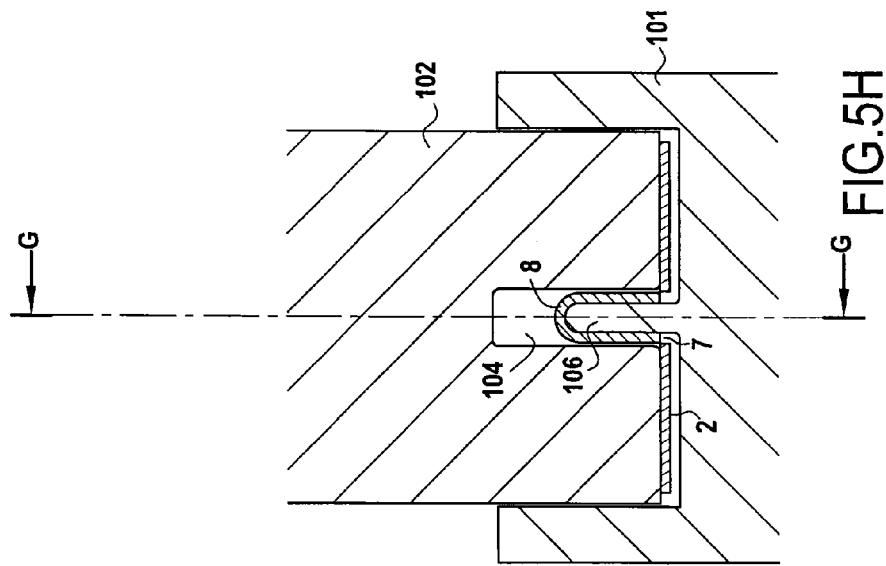
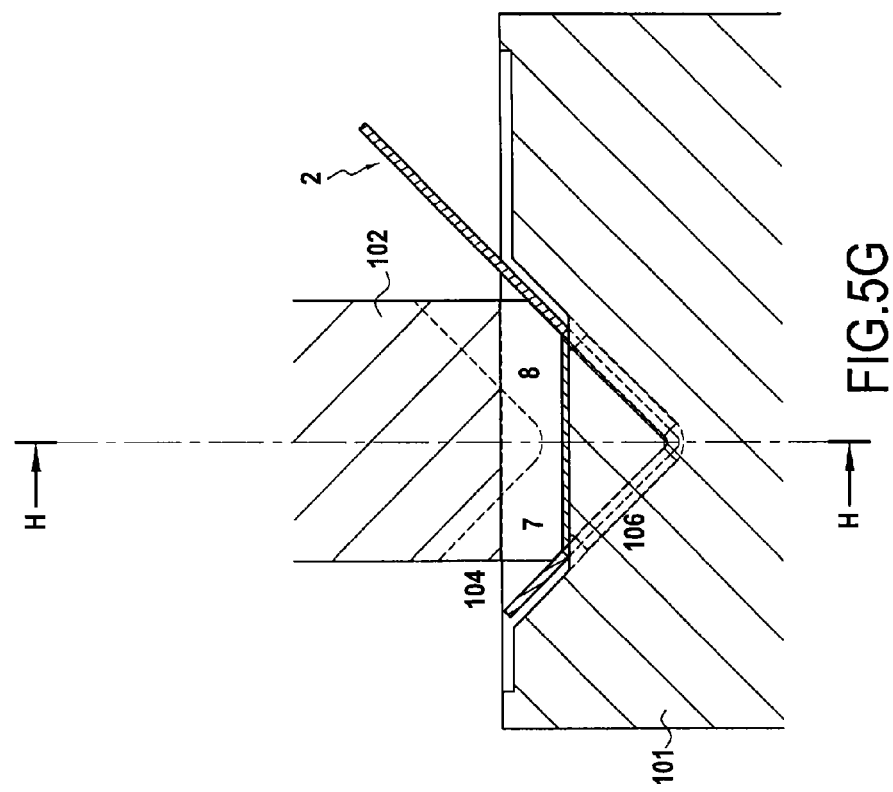

FITTING INCLUDING A COMPOSITE MATERIAL BRACKET AND A STIFFENER

BACKGROUND OF THE INVENTION

The present invention relates to fittings, particularly but not exclusively for fastening cabling and/or pipework in the aerospace field.

Metal fittings are well known to the person skilled in the art, e.g. for the purpose of fastening cabling and/or pipework. In the present context, the term "cabling" means not only electric cables, but also other filamentary devices such as optical fibers, for example. In the present context, the term "pipework" means not only ducts for conveying fluid, but also other types of hollow duct, such as heat pipes and/or waveguides, for example.

Such fittings typically comprise a bracket with two flat segments that are joined together along an edge, forming an angle less than 180° on an inside of the bracket and an angle greater than 180° on an outside of the bracket. Typically, the inside angle is about 90° and the outside angle is about 270°.

In applications that are subjected to high levels of vibration, it is normal practice to use stiffeners in order to offset the resonant frequencies of such a fitting so as to avoid it entering into resonance with such vibrations. Without such a stiffener, such resonance could lead to premature breakage of the fitting by vibration fatigue.

Typically, such fittings are made of metal, and the stiffener is welded to the bracket. Nevertheless, that presents the drawback of relatively heavy weight. In particular for aerospace applications, the use of a large quantity of such metal fittings leads to a large increase in weight, to the detriment of the performance of the vehicle in which such fittings are included.

Proposals have also been made, for example in international patent application WO 2007/078272 A2, to use composite materials for producing such a fitting with a stiffener. Nevertheless, the proposed production methods involve a production cost that is rather high.

OBJECT AND SUMMARY OF THE INVENTION

The present invention seeks to remedy those drawbacks. In particular, the invention seeks to propose a fitting, and also a method and tooling for producing such a fitting, that make it possible to reduce the weight of the fitting by using a composite material for at least a portion of the fitting, while also simplifying production thereof.

For this purpose, in at least one embodiment of a fitting according to the invention and including at least a composite material bracket with two flat segments forming an angle less than 180° on an inside of the bracket and an angle greater than 180° on an outside of the bracket, and a stiffener extending on the inside of the bracket between the two flat segments, the bracket presents a slot crossing a straight line between the two segments, the slot extending into the two segments, and the stiffener is folded in register with the slot and includes tabs fastened to each of the two flat segments.

By means of this configuration, production of the fitting is simplified. In particular, it becomes possible to reduce the number of successive production steps by combining a plurality of these steps in a single action.

According to a first additional aspect, the stiffener may pass through the slot and the tabs may be fastened to the outside of the bracket, thereby procuring particularly good fastening between the stiffener and the bracket. Nevertheless, it is also possible to envisage an alternative arrangement in which the tabs are fastened to the inside of the bracket.

According to a second aspect, the bracket may be made of thermoplastic matrix composite material, thereby making it simpler to shape the bracket and possibly also enabling shaping to be combined with a fastening step. Thus, the bracket may be produced by being folded at high temperature so as to melt the thermoplastic matrix at least in part in order to facilitate folding. Under such circumstances, the at least partially liquid state of the thermoplastic material enhances bonding between the bracket and the stiffener, in particular if the stiffener is also made of thermoplastic matrix composite material. Alternatively, the stiffener may be made of a different material, e.g. metal, and it may present orifices that are filled at least in part with said thermoplastic material in order to anchor the stiffener to the bracket.

According to a third additional aspect, the stiffener may be formed by a second flat part that is folded diagonally, thereby further facilitating production of the fitting, since folding of the stiffener can be combined in a single operation with folding of the bracket, with inserting the stiffener through the slot, and with fastening the stiffener to the bracket.

The invention also relates to a method of producing a fitting. This production method may comprise at least the following steps:

folding a first flat part along a straight line in order to form a bracket having two flat segments joined together by the edge and forming an angle less than 180° on an inside of the bracket and an angle greater than 180° on an outside of the bracket;

folding a second flat part, in register with a slot in the bracket, in order to form a stiffener, said slot crossing said straight line and extending into the two flat segments; and fastening a set of tabs of said stiffener to each of the two flat segments.

This method enables the stiffener to be well integrated in the fitting in a manner that is particularly simple. In particular, at least said steps of folding said first and second flat parts can be performed at the same time, at least in part, thereby facilitating and accelerating the production of fittings. Furthermore, according to another additional aspect, during the step of folding the second flat part in order to form the stiffener, the stiffener may be inserted through said slot from the outside of the bracket towards the inside of the bracket, said set of tabs remaining on the outside of the bracket and being fastened to the outside during the fastening step, thereby providing good fastening between the stiffener and the bracket.

The invention also relates to tooling for fabricating fittings, said tooling comprising a concave die suitable for receiving the first flat part of composite material presenting a slot, and a convex punch suitable for co-operating with said die to fold said first flat part along a straight line crossing said slot so as to form a bracket with two flat segments joined together by the edge and forming an angle less than 180° beside the convex punch and an angle greater than 180° beside the concave die. In at least one embodiment, in order to combine folding of the first and second flat parts, the convex punch may include a slot for putting into alignment with the slot in the first flat part during folding of the first flat part, and the concave die may include a projecting blade suitable for penetrating through the slot in the first flat part into the slot in the punch in order to fold the second flat part initially placed between the die and the first flat part in register with the slot in the first flat part. This tooling thus enables the bracket and the stiffener to be formed simultaneously, and possibly also for them to be fastened together.

BRIEF DESCRIPTION OF THE DRAWINGS

The invention can be well understood and its advantages appear better on reading the following detailed description of two embodiments given as non-limiting examples. The description refers to the accompanying drawings, in which:

FIG. 2 is a detail view of a fitting in a second embodiment;

FIG. 4 is a plan view from above of two flat parts for producing the fitting of FIGS. 1A and 1B, the parts being shown superposed one on the other; and FIGS. 5A to 5H show a method of producing the fitting of FIGS. 1A and 1B, using the tooling of FIG. 3, and the two flat parts of FIG. 4.

DETAILED DESCRIPTION OF THE INVENTION

Figure 1A:
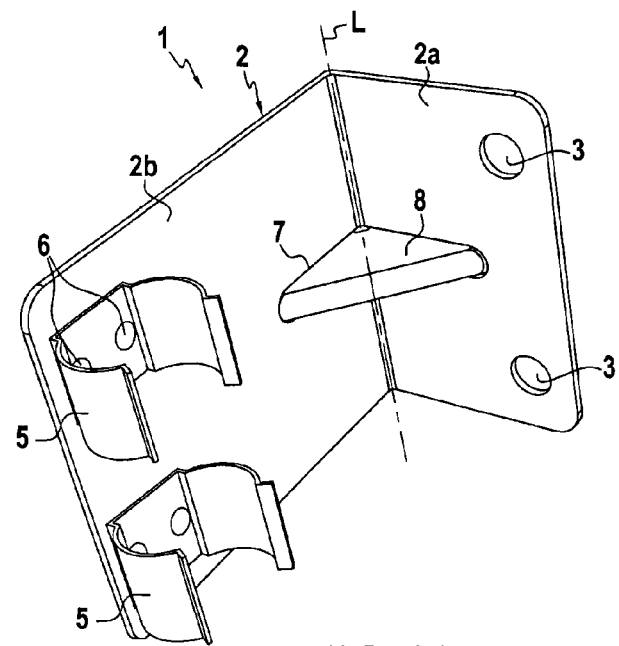
FIGS. 1A and 1B are perspective views of a fitting in a first embodiment.
Figure 1B:
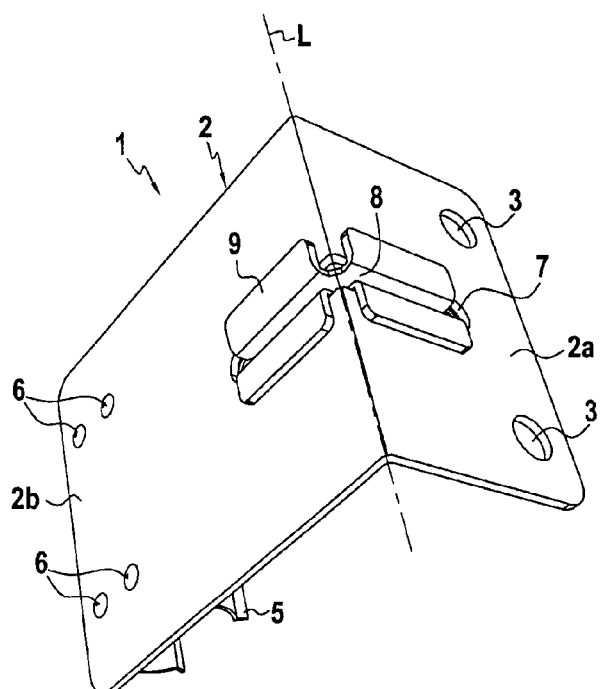

A fitting 1 in a first embodiment of the invention is shown in FIGS. 1A and 1B. The fitting 1 comprises a bracket 2 with two flat elements 2a and 2b forming a right angle along a straight line L. In the embodiments shown, the bracket 2 is made of thermoplastic matrix composite material, and more specifically a composite material having a thermoplastic matrix comprising polyether ether ketone (PEEK), and continuous reinforcing fibers of carbon. PEEK presents the particular advantage of being suitable for hot-forming, while presenting high heat resistance, which resistance is particularly useful if the fitting 1 is used, by way of example, for fastening cabling and/or pipework in a turbine engine, such as an aviation turbojet, turboprop, or turboshaft. Nevertheless, in alternative embodiments, other materials could be used, in particular other matrix materials that may be thermoplastic or thermosetting, and/or other reinforcing fibers, such as glass fibers, ceramic fibers, and/or polymer fibers.

In the bracket 2, the first flat segment 2a presents orifices 3 for fastening the fitting 1 to a support by means of bolts. The second flat segment 2b also presents orifices (not shown) having spring clips 5 fastened thereto by means of rivets 6. The spring clips 5 serve to receive at least one piece of cabling and/or pipework supported by the fitting 1. In addition, the bracket 2 also presents a slot 7 intersecting the straight line L and thus extending in both of the flat segments 2a and 2b.

The bracket 2 presents an inside in the right angle between the two flat segments 2a and 2b, and an opposite outside. The fitting 1 also includes a stiffener 8 constituted by a diagonally-folded plate. The stiffener 8 passes through the slot 7 so as to extend between the two flat segments 2a and 2b on the inside of the bracket 2, while bearing against the outside of the bracket 2. For this purpose, the stiffener 8 has two tabs 9 stuck to the outside of the bracket 2 on the two flat segments 2a and 2b. In the embodiment shown in FIGS. 1A and 1B, the stiffener 8 is made of composite material having the same thermoplastic matrix as the bracket 2. Thus, the tabs 9 can be fastened to the outside of the bracket 2 by melting the thermoplastic material of the bracket 2 and of the tabs 9.

FIG. 2 shows a fitting 1 in an alternative embodiment in which the stiffener 8 is made of a different material, such as a metal, for example, and in particular an aluminum alloy. In this alternative embodiment, which is otherwise identical to the first embodiment, the tabs 9 present a plurality of orifices 10 enabling the thermoplastic matrix of the bracket 2 to pass therethrough while in the liquid state, thereby serving to anchor the tabs 9 and thus the stiffener 8 to the outside of the bracket 2 after the thermoplastic matrix has hardened.

Figure 3:
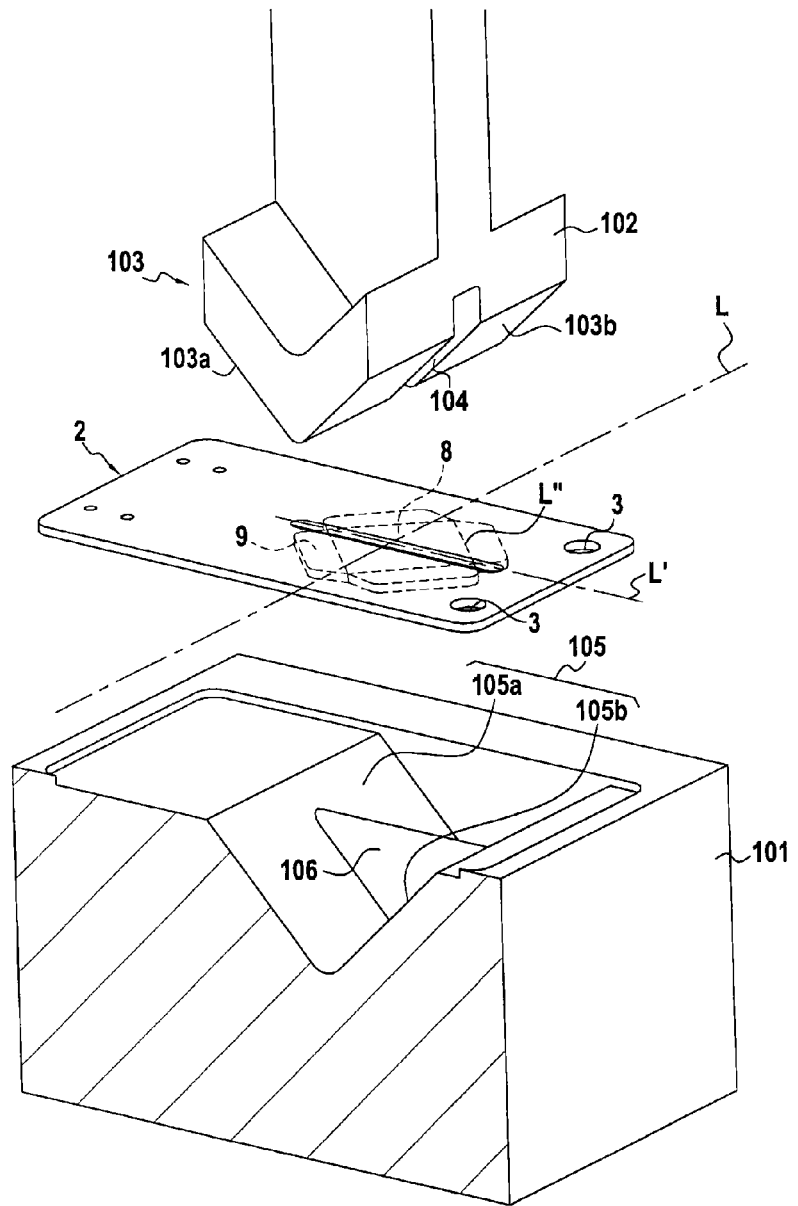
FIG. 3 is a perspective view of tooling and of two flat parts for producing the fitting of FIGS. 1A and 1B.

In both of the embodiments shown, the bracket 2 and the stiffener 8 may be shaped and joined together in a single operation using tooling as shown in FIG. 3. This tooling comprises a die 101 and a punch 102 suitable for co-operating to form the fitting 1. The punch 102 has a convex contact surface 103 with two flat segments 103a and 103b extending at right angles relative to each other. In addition, the punch also presents a slot 104 extending across the two flat segments 103a and 103b of the surface 103. The die 101 presents a concave contact surface 105 that also presents two flat segments 105a and 105b presenting a right angle relative to each other. In addition, the die 101 also includes a projecting blade 106 interconnecting the two flat segments 105a and 105b of the concave surface 105, in alignment with the slot 104 in the punch 102 and suitable for penetrating into the slot 104 when the punch 102 and the die 101 are moved one against the other.

Between the punch 102 and the die 101, FIG. 3 also shows the bracket 2 and the stiffener 8 in their initial state in the form of superposed flat parts prior to the bending and fastening operation. These flat parts are also shown in FIG. 4. The bracket 2 is to be folded along the line L, while the stiffener 8 is to be folded diagonally along the line L'. Furthermore, the tabs 9 are also to be folded, along lines L" relative to the remainder of the stiffener 8. When the above-described thermoplastic matrix composite material is used for the bracket 2 and for the stiffener 8, as in the first embodiment, the two flat parts are initially heated to a high temperature, e.g. about 400° C., so as to melt the thermoplastic matrix of the two flat parts. If this thermoplastic matrix composite material is used only for the bracket 2, as in the second embodiment, then it suffices to heat the corresponding flat part only. Either way, the reinforcing fibers maintain the cohesion of the part even when the thermoplastic matrix is in an entirely liquid state.

Figure 5D:
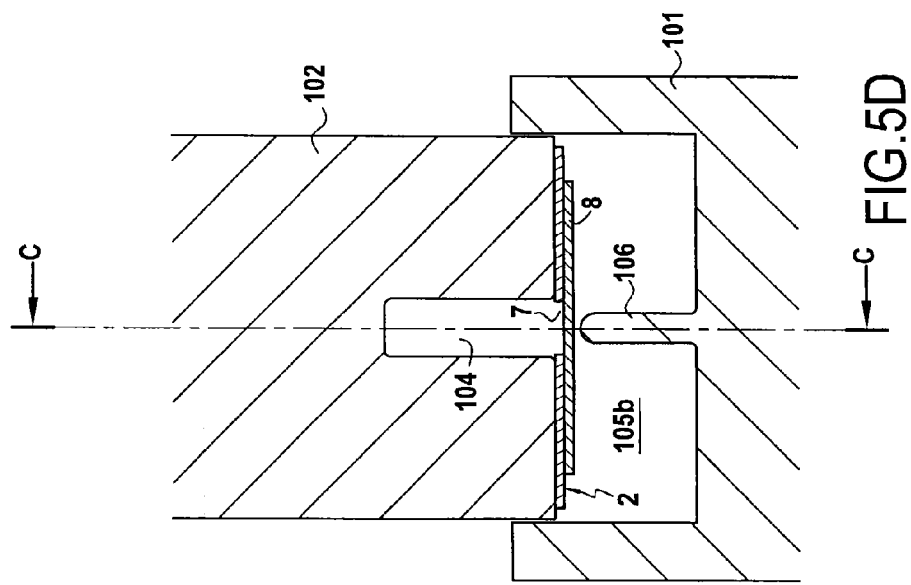
Figure 5C:
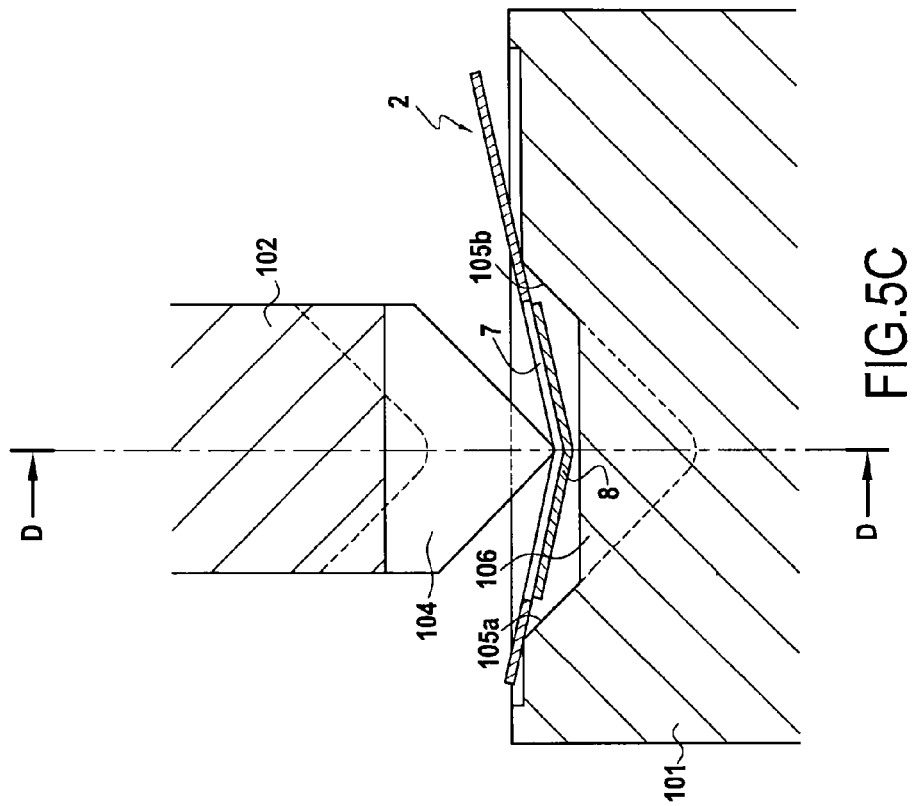

In the following step of the production method, shown in FIGS. 5A and 5B, the two parts are placed in a press between the die 101 and the punch 102. The flat part forming the stiffener 8 is placed between the flat part forming the bracket 2 and the matrix 101, and the slot 7 is aligned with the slot 104 in the punch 102 and with the blade 106 of the die 101. The press is closed, moving the punch 102 against the die 101, thus beginning to fold the bracket 2, as shown in FIGS. 5C and 5D. At half-stroke, the blade 106 comes into contact with and begins to fold the stiffener 8, pushing it through the slot 7 in the bracket 2 and into the slot 104 in the punch, as shown in FIGS. 5E and 5F. At the end of the stroke, the bracket 2 and the stiffener 8 are shaped, as shown in FIGS. 5G and 5H. Thereafter, on cooling, the thermoplastic matrix of the bracket 2 and possibly also of the stiffener 8 harden, thereby consolidating the shape of the fitting 1 and fastening the tongues 9 of the stiffener 8 to the outside of the bracket 2. The clips 5 and other accessories of the fitting 1 can then be fastened thereto.

Although the present invention is described above with reference to specific embodiments, it is clear that various modifications and changes can be undertaken on those embodiments without going beyond the general scope of the invention as defined by the claims. For example, although the bracket forms a right angle in the embodiment shown, other fittings may be considered having brackets that present angles other than a right angle. Furthermore, although the stiffener passes through the slot in the bracket in the embodiments shown and is fastened to the outside of the bracket, alternative embodiments may also be envisaged in which the tabs of the stiffener are fastened to the inside of the bracket. Consequently, the description and the drawings should be considered as being illustrative rather than restrictive.

The invention claimed is:

1. A fitting comprising:
   a composite material bracket with two flat segments forming an angle less than 180° on an inside of the bracket and an angle greater than 180° on an outside of the bracket; and
   a stiffener extending on the inside of the bracket between the two flat segments,
   wherein the bracket presents a slot crossing a straight line between the two flat segments, the slot extending into the two flat segments, and the stiffener is folded in register with the slot and includes tabs fastened to each of the two flat segments of the bracket.

2. The fitting according to claim 1, wherein the stiffener passes through the slot and the tabs are fastened to the outside of the bracket.

3. The fitting according to claim 2, wherein the bracket is made of thermoplastic matrix composite material.

4. The fitting according to claim 3, wherein the stiffener is made of thermoplastic matrix composite material.

5. The fitting according to claim 3, wherein the stiffener is made of metal.

6. The fitting according to claim 5, wherein each of the tabs of the stiffener presents a plurality of orifices that are at least partially filled with the thermoplastic matrix of said composite material.

7. The fitting according to claim 1, wherein the bracket is made of thermoplastic matrix composite material.

8. The fitting according to claim 7, wherein the stiffener is made of thermoplastic matrix composite material.

9. The fitting according to claim 7, wherein the stiffener is made of metal.

10. The fitting according to claim 9, wherein each of the tabs of the stiffener presents a plurality of orifices that are at least partially filled with the thermoplastic matrix of said composite material.

11. The fitting according to claim 1, wherein the stiffener is made from a part that is folded diagonally.

\* \* \* \* \*